(12) United States Patent
Schwabe et al.

(10) Patent No.: US 10,222,192 B2
(45) Date of Patent: Mar. 5, 2019

(54) METHOD FOR MACHINING A SCALE

(71) Applicant: DR. JOHANNES HEIDENHAIN GmbH, Traunreut (DE)

(72) Inventors: Moritz Schwabe, Chieming (DE); Peter Speckbacher, Kirchweidach (DE); Josef Weidmann, Feichten a.d. Alz (DE)

(73) Assignee: DR. JOHANNES HEIDENHAIN GMBH, Traunreut (DE)

( * ) Notice: Subject to any disclaimer, the term of this patent is extended or adjusted under 35 U.S.C. 154(b) by 215 days.

(21) Appl. No.: 15/414,729

(22) Filed: Jan. 25, 2017

(65) Prior Publication Data

US 2017/0211920 A1    Jul. 27, 2017

(30) Foreign Application Priority Data

Jan. 26, 2016  (DE) .................. 10 2016 201 088

(51) Int. Cl.
| | |
|---|---|
| *G01B 3/04* | (2006.01) |
| *B24B 19/26* | (2006.01) |
| *G01D 5/244* | (2006.01) |
| *G01D 5/347* | (2006.01) |
| *G01D 11/16* | (2006.01) |

(52) U.S. Cl.
CPC .............. *G01B 3/04* (2013.01); *B24B 19/26* (2013.01); *G01D 5/24438* (2013.01); *G01D 5/34707* (2013.01); *G01D 11/16* (2013.01)

(58) Field of Classification Search
CPC ........... G01B 3/04; G01B 3/002; G01B 3/004

USPC ......................................... 33/494, 492, 706
See application file for complete search history.

(56) References Cited

U.S. PATENT DOCUMENTS

| | | | | | |
|---|---|---|---|---|---|
| 1,728,420 | A | * | 9/1929 | Little ................... | G01B 3/04 33/492 |
| 2,182,028 | A | * | 12/1939 | Little ................... | B43L 7/00 235/70 C |
| 2,486,748 | A | * | 11/1949 | Koenig ................ | G06G 1/04 235/70 B |
| 2,939,219 | A | * | 6/1960 | Michael .............. | B43L 7/00 33/492 |

(Continued)

FOREIGN PATENT DOCUMENTS

| | | |
|---|---|---|
| DE | 850872 C | 9/1952 |
| DE | 2002157 A1 | 7/1971 |

(Continued)

*Primary Examiner* — Christopher W Fulton
(74) *Attorney, Agent, or Firm* — Leydig, Voit & Mayer, Ltd.

(57) ABSTRACT

A method for machining a scale of a position-measuring system is provided for such a scale having, on a first surface, a measuring graduation and, on a second surface, is attachable to a carrier body. The first and second surfaces are bounded respectively by first and second edges in a region of a lateral peripheral side edge. The scale is machined to produce a defined outer contour of the scale such that a raised ridge of material is formed at each of the first and second edges. The scale is machined differently at the first edge than at the second edge in such a manner that a dimension of the raised ridge of material at the first edge perpendicular to the first surface is smaller than a dimension of the raised ridge of material at the second edge perpendicular to the second surface.

19 Claims, 2 Drawing Sheets

(56) References Cited

U.S. PATENT DOCUMENTS

| | | | | |
|---|---|---|---|---|
| 3,406,456 | A | * | 10/1968 | Schleich ............... B26B 29/06 33/492 |
| 3,934,352 | A | * | 1/1976 | Quenot ............... G01B 3/004 33/493 |
| 4,484,395 | A | * | 11/1984 | Samuels ............... G01B 3/04 33/494 |
| 5,487,223 | A | * | 1/1996 | Krane ............... G01B 3/004 33/483 |
| 7,549,234 | B2 | * | 6/2009 | Holzapfel ......... G01D 5/34707 33/706 |
| 7,573,581 | B2 | | 8/2009 | Holzapfel |
| 2005/0098472 | A1 | * | 5/2005 | Rissing ............ G01D 5/34707 206/706 |
| 2007/0214671 | A1 | * | 9/2007 | Campagna ............... B43L 7/00 33/492 |
| 2011/0010955 | A1 | * | 1/2011 | Zaremski ............... B24B 3/46 33/492 |
| 2012/0023769 | A1 | * | 2/2012 | Speckbacher ...... G01D 5/34707 33/707 |

FOREIGN PATENT DOCUMENTS

| | | | |
|---|---|---|---|
| DE | 2758014 A1 | 7/1979 | |
| DE | 3004172 A1 | 8/1980 | |
| EP | 1762828 B1 | 3/2007 | |
| EP | 1783463 B1 | 5/2007 | |
| GB | 2046154 A | 11/1980 | |
| GB | 2150888 A * | 7/1985 | ............ B43L 7/005 |

* cited by examiner

METHOD FOR MACHINING A SCALE

CROSS-REFERENCE TO PRIOR APPLICATION

Priority is claimed to German Patent Application No. DE 10 2016 201 088.3, filed on Jan. 26, 2016, the entire disclosure of which is hereby incorporated by reference herein.

FIELD

The present invention relates to a method for machining a scale of a position-measuring device, as well as a scale machined using this method.

The present invention more particularly relates to the machining of a scale of a position-measuring device, which scale is provided, on a first surface, with a measuring graduation that is scannable by an associated scanning unit, and which, on a second surface facing away therefrom, is adapted to be attached to a carrier. A peripheral side edge of the scale extends between the first and second surfaces thereof. In particular, the peripheral side edge may extend around the entire circumference between the first and second surfaces. Specifically, the first and second surfaces may, for example, be oriented parallel to each other, and the peripheral side edge may extend perpendicularly thereto. The first and second surfaces merge into the peripheral side edge of the scale at a first and a second edge, respectively; i.e., the first surface is bounded by the first edge and the second surface is bounded by the second edge. The machining of such a scale serves to produce a defined outer contour of the scale and includes in particular also the machining of the first and second edges of the scale, at which the first and second surfaces merge into the (circumferential) peripheral side edge.

BACKGROUND

In the case of high-precision position-measuring devices, as described, for example, in EP 1 762 828 B1, the machining of the edges of a scale is subject to a number of conditions. This is especially true when using such measuring systems in dynamic applications, such as, for example, for high-precision movement and positioning of precision tables and platforms in the semiconductor industry. In such applications, it is usually important to minimize the mass to be moved, and to take into account the limitations on the space available for the position-measuring system. In order to reduce the weight and the dimensions of a scale, the scale is configured such that the dimension of the top surface is just sufficient to accommodate the measuring graduation to be scanned. This means that the measuring graduation extends up to the peripheral side edge of the scale and, consequently, the accuracy of the measuring graduation may be affected by the machining of the edges of the scale.

With regard to the attachment of the scale to a carrier, for example, in the form of frame, it is important that it be as positionally stable as possible and, at the same time, that the attachment process not affect the measuring graduation provided on the scale. To this end, EP 1 783 463 B1, for example, describes attaching a scale of a position-measuring device to a carrier by creating a bonded joint between the scale and the carrier, the bonded joint being produced in a plurality of surface regions of the scale which are distributed in a two-dimensional grid and spaced apart from one another.

SUMMARY

In an embodiment, the present invention provides a method for machining a scale of a position-measuring system. The scale has, on a first surface, a measuring graduation and, on a second surface, is configured to be attached to a carrier body. A lateral peripheral side edge of the scale extends between the first and second surfaces. The first and second surfaces are bounded respectively by a first and a second edge in a region of the lateral peripheral side edge. The scale is machined to produce a defined outer contour of the scale such that a raised ridge of material is formed at each of the first and second edges of the scale. The raised ridge of material in each case projects from the respective associated surface of the scale. The scale is machined differently at the first edge than at the second edge in such a manner that a dimension of the raised ridge of material at the first edge perpendicular to the first surface is smaller than a dimension of the raised ridge of material at the second edge perpendicular to the second surface.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
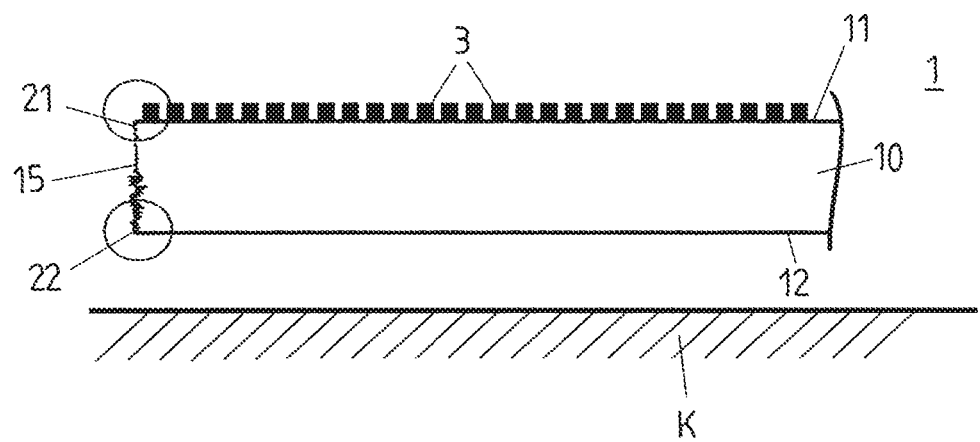
FIG. 1 is a schematic cross section through a scale having a first surface provided with a measuring graduation, and a second surface facing away therefrom and intended for attachment of the scale to a carrier, the edges of the first and second surfaces being machined differently.

In an embodiment, the present invention provides a method of the above-mentioned type for machining a scale of a position-measuring system, which method can also be used for position-measuring systems where the measuring graduation extends on the first surface of the scale up to the side edge thereof, and which also makes it possible to enhance the quality of the bond of the scale with an associated carrier. The second surface is suitable, for example, for joining to a carrier by means of bonded joints, as described in EP 1 783 463 B1, or by gluing.

According to an embodiment, on the one hand, the first edge associated with the first surface of the scale (which is provided with the measuring graduation) and, on the other hand, the second edge associated with the second surface of the scale (which serves as an attachment surface) are machined differently and in such a manner that a larger raised ridge of material is formed at the second edge than at the first edge.

The approach according to an embodiment of the present invention is based on the realization that during machining of an edge of a scale, a raised ridge of material is usually formed which, in the case of the first edge, projects from the first surface of the scale (e.g., protrudes perpendicularly from the first surface) and, in the case of the second edge, projects from the second surface of the scale (e.g., protrudes perpendicularly from second surface).

Such a raised ridge (hereinafter also referred to as "raised side edge") is formed as a result of microcracks which are formed during the machining of the scale in the region of its edges. This means that a raised ridge (raised side edge) formed during the machining of the scale and projecting from the first or second surface of the scale is, at the same time, an indicator of the number and size of microcracks formed during machining. As a result of such microcracks, the measuring graduation provided on the scale becomes distorted in the border region of the scale. These distortions are all the stronger, the greater the number and size of the microcracks that are formed during the machining of the scale, in particular in the region of the first edge; i.e., in the region of the edge bounding the first surface (provided with the measuring graduation). This, in turn, means that the distortion of the measuring graduation in the border region is all the greater, the higher the raised side edge formed during the machining of the scale (as a result of those microcracks) is. Also, the extent of the microcracks is observed to increase with increasing height of the raised side edge. This means that with increasing height of the raised side edge, the microcracks extend to a greater distance from the edge of the scale toward the center of the respective associated surface.

In accordance with an embodiment of the present invention, the scale is machined in such a manner that specifically in the region of the first edge of the scale, the resulting raised ridge of material (raised side edge) is kept small. The purpose of this is to prevent distortions in the border region of the measuring graduation provided on the first surface of the scale, which is bounded by the first edge. In contrast, at the second edge, which bounds the second surface of the scale facing away from the first surface, a raised ridge of material or raised side edge of comparatively larger size is deliberately permitted or produced. (During the machining of the edge, it is possible in principle that a raised ridge of material may be formed or that the opposite effect may occur, namely material shrinkage, resulting in a sloped side edge). Thus, the aim is to deliberately produce a raised ridge of material to thereby ensure a certain preload for the attachment of the scale to a carrier via the second surface, for example, by bonded joints (as described in EP 1 783 463 B1). This, in turn, makes it possible to prevent capillary forces from acting at the junction between the scale and the associated carrier. Such capillary forces could affect the bonding forces in the border region of the scale, and thus promote separation of the joint. For example, oil vapors or moisture could creep into the interstitial space, causing the scale to be gradually sheared off.

Consequently, in accordance with an embodiment of the present invention, the first edge of the scale, on the one hand, and its second edge are deliberately machined differently and in such a manner that a raised ridge of material or a raised side edge formed at the first edge is as small as possible while a raised ridge of material or a raised side edge of a certain height is deliberately permitted at the second edge.

The machining of the scale, in particular at its peripheral side edge, and thus at the first and second edges, may be performed mechanically, for example, by sawing, grinding or milling, and also by laser machining.

However, the formation of microcracks, and thus of a raised side edge, is not only dependent on the selected machining method, but also on other machining parameters, such as, for example, infeed, feed rate, and cutting speed of a tool. In addition, specific properties of the tool, such as, for example, the material of a tool part, the grain diameter and grain bond may also play a role.

In the region of the first edge, the machining of the scale is preferably performed in such a manner that a raised ridge of material or a raised side edge having a height of no more than 20 nm, preferably of less than 10 nm, is formed there.

The extent of the raised side edge, and thus of the microcracks, as measured from the first edge toward the center of the first surface, should be no more than 500 µm, and particularly preferably no more than 200 µm.

At the second edge of the scale; i.e., on the side of the scale that serves for attachment to a carrier body, the raised side edge should have a height of between 10 nm and 500 nm, particularly preferably between 20 m and 100 nm. The extent of the raised side edge, and thus of the microcracks caused by the machining, should be limited to 2,000 µm, and particularly preferably to 500 µm.

The extent of the raised side edge from the first or second edge is understood to mean the extent of the surface region (perpendicular to the longitudinal extent of the first or second edge and along the associated first or second surface) toward the center of the first or second surface, in which region the flatness of the first or second surface is disturbed due to the machining of the associated first or second edge and the resulting raised ridge of material. This takes into account that in the regions of the first or second surface that are not affected by the machining of the first or second edge, there are also (random) deviations from an ideally flat surface, which reflect the roughness of the surface. However, in the surface regions adjacent to the first or second edge, or to the respective raised ridge of material present there, the deviations from flatness are greater than the surface roughness in the undisturbed (central) regions. Thus, the extent of the raised side edge indicates the extent of the surface region from the first or second edge in which region the deviations from flatness of the surface (caused by the machining of the respective edge) are greater than in the surface regions that are not affected by the machining.

A reduction in the number and size of microcracks by suitably machining the first edge of the scale is associated with a corresponding reduction in surface roughness. In this way, it is possible to achieve a roughness (Rq value) of less than 80 nm. If glass-ceramic material is used for the base body of the scale, then its surface is transparent even after machining. This may be used to optically check the installation quality of the scale. Moreover, reducing machining stress during the machining of the edges improves the straightness of the scale.

The first or second surface of the scale does not necessarily have to merge, at the associated first or second edge, directly into a lateral peripheral side edge extending substantially perpendicularly to the first and second surfaces. Rather, the first edge and/or the second edge may directly adjoin a bevel which, in turn, merges into the lateral peripheral side edge.

The use of the inventive method on a scale can be verified on the resulting product in various ways, for example, by optical methods for determining the edge quality (in particular based on the roughness and/or transparency of the surface), which can be done using a light microscope, or by measuring the raised side edge using, for example, a white-light microscope, or by measuring the microcracks, for example, through microcrack analysis by material removal.

FIG. 1 shows a cross section through a scale 1 which is provided, on a first large-area surface 11, with a measuring graduation 3, and which, on a second large-area surface 12 facing away therefrom, is adapted for attachment to a carrier body K. The two surfaces 11, 12 are flat and, in the exemplary embodiment, extend substantially parallel to one another.

Base body 10 of scale 1 is preferably made of a material having a thermal expansion coefficient as near as possible to zero, such as, for example, glass-ceramic (ZERODUR). Scale 1, may for example, take the form of a longitudinal scale for length measurement or a measuring plate for two-dimensional position measurements. Accordingly, the measuring graduation may be a grating, for example, a cross grating in the two-dimensional case.

Measuring graduation 3 is configured to be scannable, for example, optically, magnetically or inductively by an associated scanning unit. In order to minimize the weight and space requirements of scale 1, its measuring graduation 3 extends up to edge 21 of first surface 11, which edge forms a transition to the (circumferential) peripheral side edge 15 of scale 1. Peripheral side edge 15 of scale 1 extends between first surface 11 and second surface 12 of scale 1 and is oriented substantially perpendicular to surfaces 11, 12. Peripheral side edge 15 surrounds scale 1 laterally.

In order to produce a defined outer contour, scale 1 is machined, for example, mechanically by milling, grinding or sawing, or also by material removal using a laser. In the present case, the manner in which machining is performed at first edge 21 of the scale, where first surface 11 merges into side edge 15, differs from the manner in which machining is performed at second edge 22 of the scale, where second surface 12 merges into peripheral side edge 15.

Figure 1A:
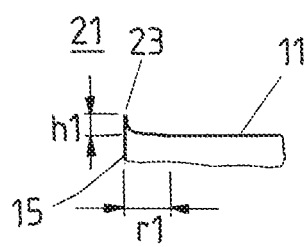
FIG. 1A is an enlarged detail view of the scale of FIG. 1 in the region of the first edge.
Figure 1B:
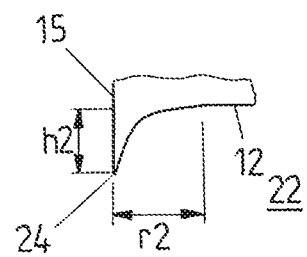
FIG. 1B is an enlarged detail view of the scale of FIG. 1 in the region of the second edge.

The result of the machining in the region of first and second edges 21, 22 is illustrated enlarged in FIGS. 1A and 1B.

In the region of first edge 21, the machining produced a raised ridge of material or raised side edge 23 whose height h1 (defined as the dimension perpendicular to first surface 11) is limited to a maximum of 20 nm, preferably to less than 10 nm. The extent r1 of the raised ridge of material or raised side edge 23 (defined as its dimension from first edge 21 toward the center of first surface 11) should be no more than 500 μm, and particularly preferably no more than 200 μm.

Since first edge 21 bounds first surface 11 of scale 1, which is provided with measuring graduation 3, this minimizes the number and extent of the microcracks that could lead to a distortion of measuring graduation 3, which extends up to side edge 15 of scale 1.

In contrast, on the opposite, second surface 12 of scale 1, a raised ridge of material or raised side edge 24 is, in fact, desired in order to provide a preload for the attachment of scale 1 to a carrier body K via second surface 12. In this case, height h2 of the raised ridge of material or raised side edge 24 (defined as the dimension of the raised ridge of material or raised side edge 24 perpendicular to second surface 12) should be between 10 nm and 500 nm, preferably between 20 nm and 100 nm. The extent r2 of the raised ridge of material or raised side edge (defined as its dimension from second edge 22 toward the center of second surface 12) should be limited to 2,000 μm, preferably to 500 μm.

Figure 2:
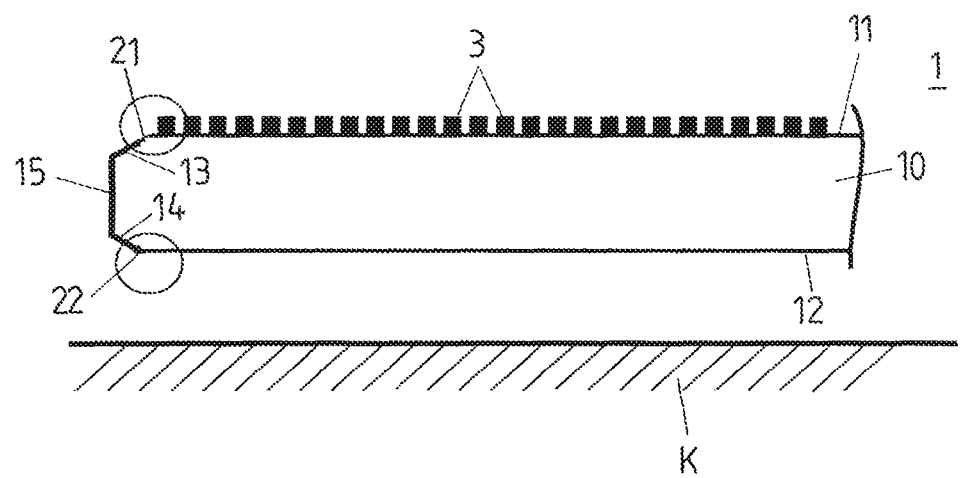
FIG. 2 is a cross-sectional view showing a variant of the scale of FIG. 1.
Figure 2A:
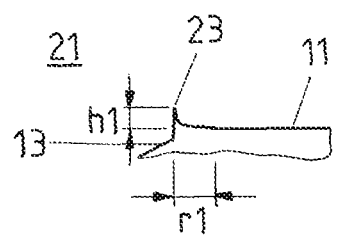
FIG. 2A is an enlarged detail view of the scale of FIG. 2 in the region of the first edge.
Figure 2B:
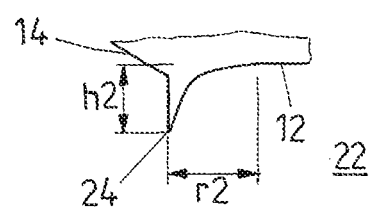
FIG. 2B is an enlarged detail view of the scale of FIG. 2 in the region of the second edge.

FIGS. 2, 2A and 2B illustrate a variant of the arrangement shown in FIGS. 1, 1A and 1B, the difference in FIGS. 2, 2A and 2B being that first and second surfaces 11, 12 do not merge directly into lateral peripheral side edge 15 at the associated first and second edges 21, 22. Rather, the first edge and second edges 21, 22 directly adjoin a respective bevel 13, 14 which (at its end facing away from the respective edge 21, 22) merges into lateral peripheral side edge 15. The means that first and second edges 21, 22 of the scale 1 shown in FIGS. 2, 2A and 2B each lie between the associated first or second surface and a respective bevel 13, 14 extending therefrom, each of which, in turn, merges into peripheral side edge 15.

Thus, the first edge 21 in question at first surface 11 of scale 1 is the edge that bounds this first surface 11 and during the machining of which microcracks may form in the region of measuring graduation 3 provided on first surface 11.

The second edge 22 in question in the region of second surface 12 is the edge that bounds second surface 12 and during the machining of which a raised ridge of material or raised side edge is formed which projects from second surface 12 (substantially perpendicularly therefrom), so that when scale 1 is placed with second surface 12 on a carrier body K, this second surface 12 contacts the facing surface of this carrier body K first with the raised ridge of material or raised side edge 24 at second edge 22.

The machining of a respective edge 21, 22 of scale 1 may, on the one hand, be performed together with the machining of adjacent regions of lateral peripheral side edge 15 of scale 1 and/or of first or second surface 11, 12. Furthermore, a respective edge 21, 22 of scale 1 may also be subjected to a post-machining process specifically intended for the respective edge 21 or 22 in order to form the above-described raised ridges of material or raised side edges.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A method for machining a scale of a position-measuring system, the scale having, on a first surface, a measuring graduation and, on a second surface, is configured to be attached to a carrier body, a lateral peripheral side edge of the scale extending between the first and second surfaces, the first and second surfaces being bounded respectively by a first and a second edge in a region of the lateral peripheral side edge, the method comprising:
    machining the scale to produce a defined outer contour of the scale such that a raised ridge of material is formed at each of the first and second edges of the scale, the raised ridge of material in each case projecting from the respective associated surface of the scale,
    wherein the scale is machined differently at the first edge than at the second edge in such a manner that a dimension of the raised ridge of material at the first edge perpendicular to the first surface is smaller than a dimension of the raised ridge of material at the second edge perpendicular to the second surface.

2. The method as recited in claim 1, wherein the scale is machined differently at the first edge than at the second edge in such a manner that the dimension of the raised ridge of material at the second edge is at least 25% greater than the dimension of the raised ridge of material at the first edge.

3. The method as recited in claim 2, wherein the scale is machined differently at the first edge than at the second edge in such a manner that the dimension of the raised ridge of material at the second edge is at least 50% greater than the dimension of the raised ridge of material at the first edge.

4. The method as recited in claim 1, wherein the scale is machined mechanically at the first edge and/or at the second edge.

5. The method as recited in claim 4, wherein the scale is machined at the first edge and/or at the second edge by milling, grinding or sawing.

6. The method as recited in claim 1, wherein the scale is machined at the first edge and/or at the second edge by laser radiation.

7. The method as recited in claim 1, wherein the scale is processed at the first edge in such a manner that the dimension of the raised ridge of material at the first edge perpendicular to the first surface is no more than 20 nm.

8. The method as recited in claim 7, wherein the scale is processed at the first edge in such a manner that the dimension of the raised ridge of material at the first edge perpendicular to the first surface is no more than 10 nm.

9. The method as recited in claim 1, wherein the scale is processed at the second edge in such a manner that the dimension of the raised ridge of material at the second edge perpendicular to the second surface is between 10 nm and 500 nm.

10. The method as recited in claim 9, wherein the scale is processed at the second edge in such a manner that the dimension of the raised ridge of material at the second edge perpendicular to the second surface is between 20 nm and 100 nm.

11. The method as recited in claim 1, wherein the scale is machined at the first edge in such a manner that the raised ridge of material formed at the first edge extends less than 500 μm from the first edge toward the center of the first surface.

12. The method as recited in claim 11, wherein the scale is machined at the first edge in such a manner that the raised ridge of material formed at the first edge extends less than 200 μm from the first edge toward the center of the first surface.

13. The method as recited in claim 1, wherein the scale is machined at the second edge in such a manner that the raised ridge of material formed at the second edge extends less than 2,000 μm from the second edge toward the center of the second surface.

14. The method as recited in claim 13, wherein the scale is machined at the second edge in such a manner that the raised ridge of material formed at the second edge extends less than 500 μm from the second edge toward the center of the second surface.

15. A scale of a position-measuring system, the scale comprising:
    a first surface on which a measuring graduation is formed;
    a second surface configured to attach the scale to a carrier body;
    a lateral peripheral side edge extending between the first and second surfaces of the scale, the first and second surfaces of the scale being bounded respectively by a first and a second edge in a region of the lateral peripheral side edge; and
    a raised ridge of material projecting from each of the first and second edges,
    wherein the raised ridge of material at the first edge of the scale projects from the first surface perpendicularly to the first surface with a dimension that is smaller than a dimension by which the raised ridge of material at the second edge of the scale projects from the second surface perpendicularly to the second surface.

16. The scale as recited in claim 15, wherein the scale has a base body of glass-ceramic.

17. The scale as recited in claim 15, wherein the dimension of the raised ridge of material at the first edge of the scale perpendicular to the first surface is no more than 20 nm.

18. The scale as recited in claim 15, wherein the dimension of the raised ridge of material at the second edge of the scale perpendicular to the second surface is between 10 nm and 500 nm.

19. A scale, the scale having, on a first surface, a measuring graduation and, on a second surface, is configured to be attached to a carrier body, a lateral peripheral side edge of the scale extending between the first and second surfaces, the first and second surfaces being bounded respectively by a first and a second edge in a region of the lateral peripheral side edge, the scale being formed by:
    machining the scale to produce a defined outer contour of the scale such that a raised ridge of material is formed at each of the first and second edges of the scale, the raised ridge of material in each case projecting from the respective associated surface of the scale,
    wherein the scale is machined differently at the first edge than at the second edge in such a manner that a dimension of the raised ridge of material at the first edge perpendicular to the first surface is smaller than a dimension of the raised ridge of material at the second edge perpendicular to the second surface.

* * * * *